Aug. 25, 1942.  H. W. GAGER  2,293,896
COUPLING DEVICE FOR TOY VEHICLES
Filed June 20, 1940

HOWARD W. GAGER
INVENTOR.

BY Jesse R. Stone
Lester B. Clarke
ATTORNEYS.

Patented Aug. 25, 1942

2,293,896

UNITED STATES PATENT OFFICE 2,293,896

COUPLING DEVICE FOR TOY VEHICLES

Howard W. Gager, Houston, Tex.

Application June 20, 1940, Serial No. 341,435

2 Claims. (Cl. 213—107)

This invention relates to an improved coupling device for providing a simple and efficient releasable connection between leading and trailing vehicles or cars. The invention is of general utility but is particularly useful in providing a releasable connection between toy tractor and trailer vehicles or cars.

The primary object of the invention is to provide a device of the class described which is simple and inexpensive to construct and which is efficient in operation.

Another object is to provide a connection of the class described which enables automatic interconnection of vehicles by relative movement of such vehicles toward each other.

Still another object is to provide a connection which may be disconnected either automatically or manually as desired.

A further object is to provide a connection in which the latching means is maintained in latching position by the force of gravity but is movable for releasing the connection by moving the latching element against the force of gravity.

Another and more specific object is to provide a connection having a ratchet or star wheel on one of the vehicles which is moved by a coupling member on another vehicle and which is held in latching position by a pawl cooperating with the ratchet wheel.

The foregoing together with other objects will become apparent from a consideration of the following description of an illustrative embodiment of the invention, such description referring to the accompanying drawing in which.

Figure 1:
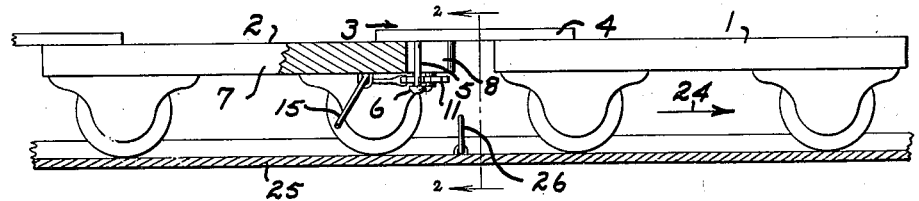
Fig. 1 is an elevational view showing trailer vehicles equipped with a connection illustrative of the invention, parts being shown in section to disclose structural details.

In the drawing 1 and 2 are trailer vehicles between which a releasable connection 3 is provided. The vehicle 1 carries a coupling member 4 having a coupling pin 5 extending vertically therefrom and provided with a head 6.

The frame or base 7 of the vehicle 2 is shown as constituting a coupling member which is provided with a slot 8 to receive the pin 5 as the units 1 and 2 are moved relatively toward each other. As the pin 5 moves into the slot 8 it engages one of the teeth 10 on a star or ratchet wheel 11 which is pivoted at 12 adjacent the slot 8 so that the teeth 10 overlie the slot. It seems apparent that, as viewed in Fig. 3, entry or withdrawal of pin 5 from the slot 8 will cause limited angular rotation of the star wheel 11.

Figure 3:
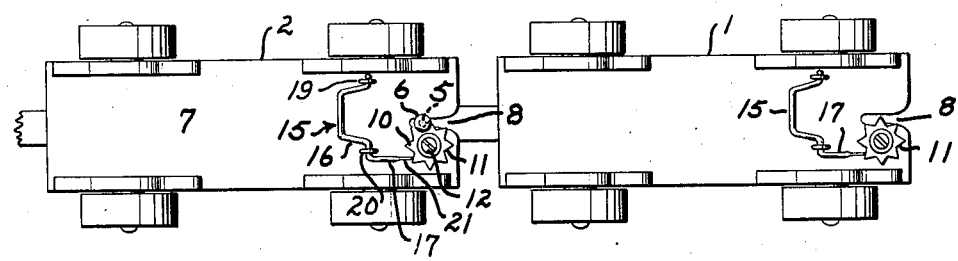
Fig. 3 is a bottom plan view of the trailer vehicles shown in Fig. 1.

It is desired that, as viewed in Fig. 3, the star wheel 11 rotates freely in a counterclockwise direction as the pin 5 enters the slot 8 but that, in order to effect a connection between the units 1 and 2, the star wheel be restrained from rotation in the opposite direction when a force is applied tending to withdraw the pin from within the slot. This manner of functioning is brought about by means of a latch pawl mechanism generally referred to as 15, and comprises a generally U-shaped wire or rod 16 having an extension 17 on one limb thereof acting as a pawl arm to engage the star wheel 11. The pawl arm 17 is displaced angularly from the remaining portion of the latch member 15 so that the U-shaped portion thereof depends downwardly and is retained in such position by the force of gravity acting thereon since the entire latch is pivotally mounted upon journals 19 and 20 attached to the lower side of the member 7.

It is to be noted that the latch member 15 is rotatably mounted in the journal member 19 in such a manner that axial movement of the latch member in the journal is avoided. Journal 20, however, is positioned approximately mid way between the reverse bends connecting the U-shaped portion 16 with the pawl arm 17. By virtue of this construction the entire latch member 15 between journal 19 and the end 21 thereof serves as a spring whereby the pawl arm 17 serves the desired function as will more fully appear.

It is apparent that any upward force upon the U-shaped portion 16 of the latch 15 will cause the latch member to rock in its journal and hence the pawl arm 17 will move downward from engagement with the star wheel 11. In this manner the star wheel is free to rotate and hence a connection previously made is released by such lifting of the depending position of the latch member 15.

Figure 2:
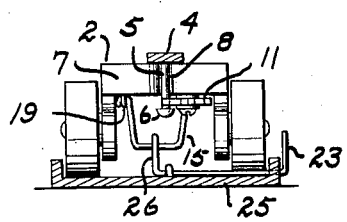
Fig. 2 is a sectional view taken on line 2—2 in Fig. 1.

In order to make this feature automatic the road or trackway 25 upon which the vehicles 1 and 2 travel in the direction indicated by the arrow 24 is provided with a manually operable arm 26 which is pivoted upon the roadway as indicated in Fig. 2 so that the arm 26 may be moved to a vertical position by means of a lever 23 adjacent the roadway.

The operation of the embodiment as thus far described is believed apparent. By way of summary it will be assumed the vehicle 1 is moved toward the vehicle 2 so that the pin 5 enters the slot 8 thus engaging one of the teeth 10 on the star wheel 11 and causing rotation thereof. Prior to this rotation the end 21 may be in engagement with the lower face of one of the teeth 10 on the star wheel 11 or may have entered the notch between adjacent teeth. If the former, initial rotational movement of the star wheel will permit the end 21 to enter the notch between adjacent teeth and hence to effect desired locking of the star wheel. If the end 21 had previously entered the notch between adjacent teeth of the star wheel 11, the rotation of the star wheel will cause the pawl arm 17 to be resiliently moved outwardly by the nearest adjacent tooth and as the pin 5 approaches the inner end of the slot 8 the pawl arm will ride over the tip of such adjacent tooth and engage the rearmost surface thereof. Such engagement will prevent rotation of the star wheel 11 in the opposite direction when a force is applied tending to withdraw the pin 5 from within the slot 8. The connection 5 is thus completed and the training vehicle 2 will be drawn by the motive force applied to the vehicle 1.

In order to disconnect the trailer vehicles 1 and 2 the lever 23 may be operated to tilt the arm 26 upward to engage the U-shaped portion 16 of the latch member 15. Thus as the trailer vehicles 1 and 2 pass over the arm 26 the U-shaped portion of the latch member 15 will be engaged thereby and the latch member will be tilted within the journals 19 and 20 whereby the latch arm 17 will move from engagement with the star wheel 11. The star wheel is then free to rotate and accordingly the pin 5 may be withdrawn from within the slot 8.

Figure 4:
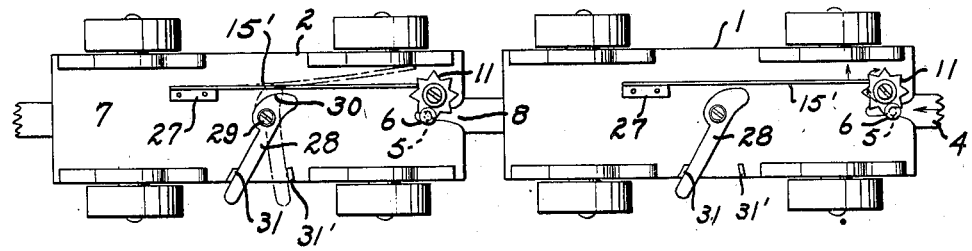
Fig. 4 is a bottom plan view of the trailer vehicles showing a manually operable modification of the connection.

The latching mechanism is shown in modified form in Fig. 4 wherein the star wheel 11 is shown as positioned on the opposite side of the slot 8. The latching member 15 in this modification comprises a leaf spring which is anchored at 27 upon the nether surface of the member 7. The leaf spring 15' is normally in a position to engage a tooth of the star wheel 11 in a manner identical to the construction as shown in Figs. 1 to 3.

In order to release the leaf spring 15' from engagement with the star wheel 11 an arm 28 is pivotally mounted at 29 upon the member 7. This arm has a cam surface 30 which is normally in spaced relation with the leaf spring 15' when the arm is engaged with a stop 31 upon the member 7. In order to effect a release of the connection the arm 28 may be moved manually into engagement with a stop 31' as indicated in dotted outline whereby the cam surface 30 moves the leaf spring 15' from engagement with the star wheel 11. The star wheel is thus free to rotate and the pin 5 may be withdrawn from within the slot 8.

It is undestood that a plurality of trailer vehicles may be interconnected by means of the releasable connection of the invention and the forward vehicle in each of Figs. 3 and 4 is shown as provided with a duplicate latching mechanism at its forward end.

Broadly the invention comprehends a ratchet type of releasable connection which is simple and inexpensive to construct and efficient in its operation.

What is claimed is:

1. In a coupler for a leading vehicle and a trailing vehicle the combination of a coupling pin on one of the vehicles, a member on the other of the units having a slot into which said pin is adapted to enter as the vehicles are moved toward each other, a star wheel mounted on said member with the teeth thereof overlying the slot so that the wheel is rotated as the pin enters the slot, stop means mounted on the member and movable by the teeth of the star wheel as the pin moves into the slot but adapted to restrain the wheel from rotation in the opposite direction, said last mentioned means comprising a pawl member pivoted horizontally intermediate a pawl arm and a depending portion responsive to the force of gravity to move the pawl arm into the notches of the star wheel, the pivot connection intermediate the pawl arm and the depending portion being adapted to permit movement of the pawl member axially of the pivot, whereby the pawl arm is movable under resiliency of the entire pawl member.

2. In a coupler for a leading vehicle and a trailing vehicle, a coupling pin on one of the vehicles, a member on the other of the vehicles having a slot to receive said pin as the vehicles are moved toward each other, a star wheel mounted on said member with the teeth thereof overlying the slot so that the wheel is rotated as the pin enters the slot, a pawl member pivotally mounted at spaced points on said member and extending transversely of the axis of the star wheel, said pawl member comprising a pawl arm and a depending U-shaped portion, said portion being resilient transversely thereof whereby said pawl arm is adapted to ride upon the teeth of the star wheel as the pin enters the slot and to engage and restrain the wheel from rotation in the opposite direction, and said depending portion being responsive by gravity to hold the pawl arm in position for engagement with the star wheel but engageable beneath the vehicle to move the pawl arm and release the star wheel from engagement thereby so that the pin may be removed from within the slot.

HOWARD W. GAGER.